United States Patent
Keilwert et al.

(10) Patent No.: US 11,087,581 B2
(45) Date of Patent: Aug. 10, 2021

(54) CORRECTLY INTERPRETING FAILED TOUCH INPUT USING GESTURE INPUT AT GAMING DEVICES, AND RELATED DEVICES, SYSTEMS, AND METHODS

(71) Applicant: IGT, Las Vegas, NV (US)

(72) Inventors: Stefan Keilwert, St. Josef (AT); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/694,760

(22) Filed: Nov. 25, 2019

(65) Prior Publication Data

US 2021/0158648 A1 May 27, 2021

(51) Int. Cl.
*G07F 17/32* (2006.01)
*G06F 3/041* (2006.01)
*G06F 3/0488* (2013.01)

(52) U.S. Cl.
CPC ........ *G07F 17/3209* (2013.01); *G06F 3/0418* (2013.01); *G06F 3/04883* (2013.01); *G07F 17/3206* (2013.01)

(58) Field of Classification Search
USPC .......................................................... 463/36
See application file for complete search history.

(56) References Cited

U.S. PATENT DOCUMENTS

| | | | |
|---|---|---|---|
| 8,062,115 B2 | 11/2011 | Thomas et al. | |
| 8,959,459 B2 | 2/2015 | Aoki et al. | |
| 10,198,904 B2 | 2/2019 | Froy et al. | |
| 2011/0310041 A1* | 12/2011 | Williams | G06F 11/3696 345/173 |
| 2012/0108337 A1 | 5/2012 | Kelly et al. | |
| 2017/0028295 A1 | 2/2017 | Patton et al. | |
| 2018/0130283 A1 | 5/2018 | Froy et al. | |

* cited by examiner

*Primary Examiner* — Pierre E Elisca
(74) *Attorney, Agent, or Firm* — Sage Patent Group

(57) ABSTRACT

A gaming device, and related devices, methods, and systems, may include a touch input device to detect touch inputs performed by a user, and a gesture input device to detect gesture inputs performed by the user. The gaming device may further includes a processor circuit and a memory coupled to the processor circuit. The memory may include machine-readable instructions that, when executed by the processor circuit, cause the processor circuit to: receive a first touch input value from the touch input device; receive a first gesture input value from the gesture input device, generate, based on the first gesture input value, a corrected touch input value corresponding to an intended touch input that is determined to be intended by the user, and modify a user interface element of the gaming device based on the first gesture input value and the corrected touch input value.

20 Claims, 13 Drawing Sheets

CORRECTLY INTERPRETING FAILED TOUCH INPUT USING GESTURE INPUT AT GAMING DEVICES, AND RELATED DEVICES, SYSTEMS, AND METHODS

BACKGROUND

Embodiments described herein relate to providing input at gaming devices, and in particular to predicting touch inputs at gaming devices using gesture input, and related devices, systems, and methods.

Gaming devices, such as electronic gaming machines (EGMs), may provide input devices for facilitating play of a game by a user at the gaming device, and for providing additional interactive functionality at the gaming device. Many conventional gaming devices employ relatively simple input devices, such as buttons or keypads, which limit the features and functionality that can be offered at the gaming device.

BRIEF SUMMARY

According to some embodiments, a gaming device includes a touch input device to detect touch inputs received from a user, a gesture input device to detect gesture inputs performed by the user, a processor circuit and a memory coupled to the processor circuit. The memory includes machine-readable instructions that, when executed by the processor circuit, cause the processor circuit to receive a first touch input value from the touch input device, receive a first gesture input value from the gesture input device, generate, based on the first gesture input value, a corrected touch input value corresponding to an intended touch input that is determined to be intended by the user, and modify a user interface element of the gaming device based on the first gesture input value and the corrected touch input value.

According to some embodiments, a method includes operations of detecting, by a gesture input device of a gaming device, a first gesture by a user of the gaming device, detecting, by a touch input device of the gaming device, a first touch input value from the user, generating, by the gesture input device, a first gesture input value based on the first gesture, generating, based on the first gesture input value, a corrected touch input value corresponding to an intended touch input that is determined to be intended by the user and that is different from the first touch input value, and modifying a user interface element of the gaming device based on the first gesture input value and the corrected touch input value.

According to some embodiments, a system includes a processor circuit and a memory coupled to the processor circuit. The memory includes machine-readable instructions that, when executed by the processor circuit cause a gesture input device of a gaming device to detect a first gesture by a user of the gaming device and to generate a first gesture input value based on the first gesture. A touch input device of the gaming device is caused to detect a first touch by the user on the touch input device and generate a first touch input value based on the first touch. The processor circuit is caused to receive the first gesture input value from the gesture input device, receive a first touch input value from the touch input device that corresponds to the first touch input, generate, based on the first gesture input value and the first touch input value, a corrected touch input value, and cause a game function to occur based on the corrected touch input value and not the first touch input value.

DETAILED DESCRIPTION

Figure 1:
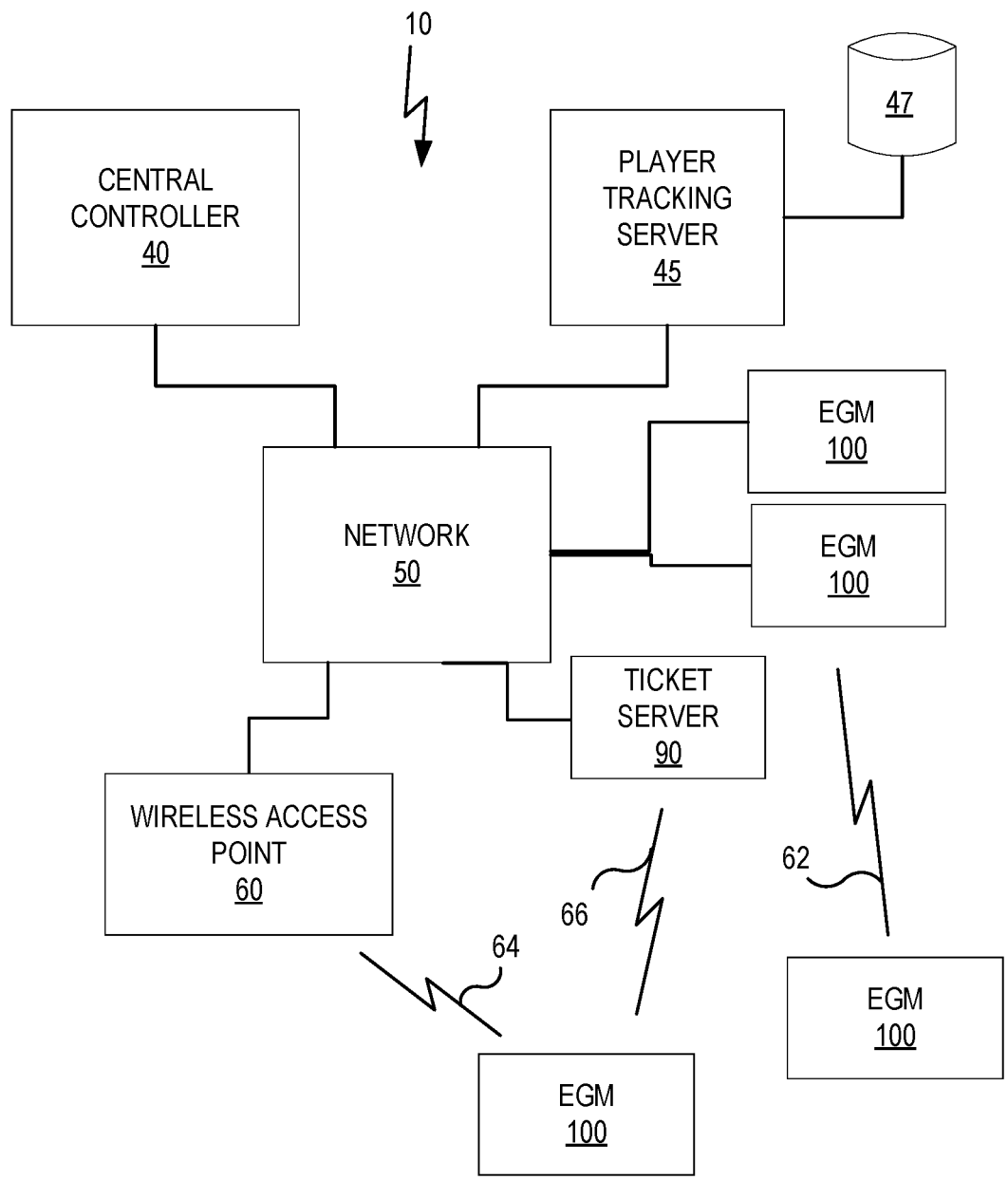
FIG. 1 is a schematic block diagram illustrating a network configuration for a plurality of gaming devices according to some embodiments.

Touch input functionality is widely used throughout the gaming industry, such as through touchscreens and other touch input devices. By using gesture sensors and other types of input devices to detect movement, gestures, or other types of non-contact inputs proximate to the touch input device, failed touch inputs and other types of contact inputs may be corrected after they occur to provide corrected inputs, thereby enabling new ways for users to interact with the gaming devices. In some embodiments, a user may refer to a player or other participant interacting with a gaming device.

In some embodiments, hand-tracking data may be generated by gesture input devices to provide corrections for failed inputs that may occur with a touchscreen interface of a gaming device. For example, a user's hand or a held object may be recognized in front of a gaming device via visual or non-visual technologies. Speed, acceleration, and/or direction of movement may also be determined and analyzed in addition to position, which may be used to identify and/or correct a failed input corresponding to a user's interaction intentions and derive concrete actions, such as modifying user interface elements of the gaming device, to improve and modify the game's content and user interfaces.

Some embodiments are directed to correctly interpreting failed touch inputs on a display device in an EGM using hand tracking sensors. In some embodiments, a display device may not reliably recognize a touch input correctly. For example, an intended swipe gesture might be recognized as multiple distinct touch interactions, instead of a continuous swipe, if the user does not continuously contact the touchscreen during the motion. As disclosed herein, the user's intended swiping along the touch path may be interpreted as a swiping input even though the touch signal may be interrupted by analyzing touch interaction signals and hand tracking signals in combination.

According to some embodiments, the game context may be used to determine a user's intended touch input even if the user fails to interact with the touch interface correctly. For example, in addition to the actual touch input, hand movement tracking prior to and after the touch input in a game chooser may provide an interpretation that the user intended to swipe.

In some embodiments, a user may intend to push a button but may actually press an area of the touch interface that is directly adjacent the button. The detected hand movement may be used to properly interpret that the intended touch input corresponds to the button and detect the push as an intended button press.

In some embodiments, a touch interface may be configured to only receive a single touch input at any given point in time. However, a user may inadvertently cause the touch interface to be touched at multiple points, thus rendering the touch input as not determinable. As provided herein, determining the intended touch input may be performed by using data from the hand placement based on the detected hand movement.

Some embodiments provide that in a single touch screen device, multiple touch points that might otherwise be interpreted improperly in combination may be interpreted as a single touch point based on the position of the hand.

By addressing a technical problem for correcting failed touch inputs as described herein, a technical solution provided herein may improve the interaction between a human and a machine by being less-sensitive to input errors.

Referring to FIG. 1, a gaming system 10 including a plurality of gaming devices 100 is illustrated. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the user's gameplay and spending and/or other user preferences and customizations, manages loyalty awards for the user, manages funds deposited or advanced on behalf of the user, and other functions. User information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Gaming Devices

Figure 2A:
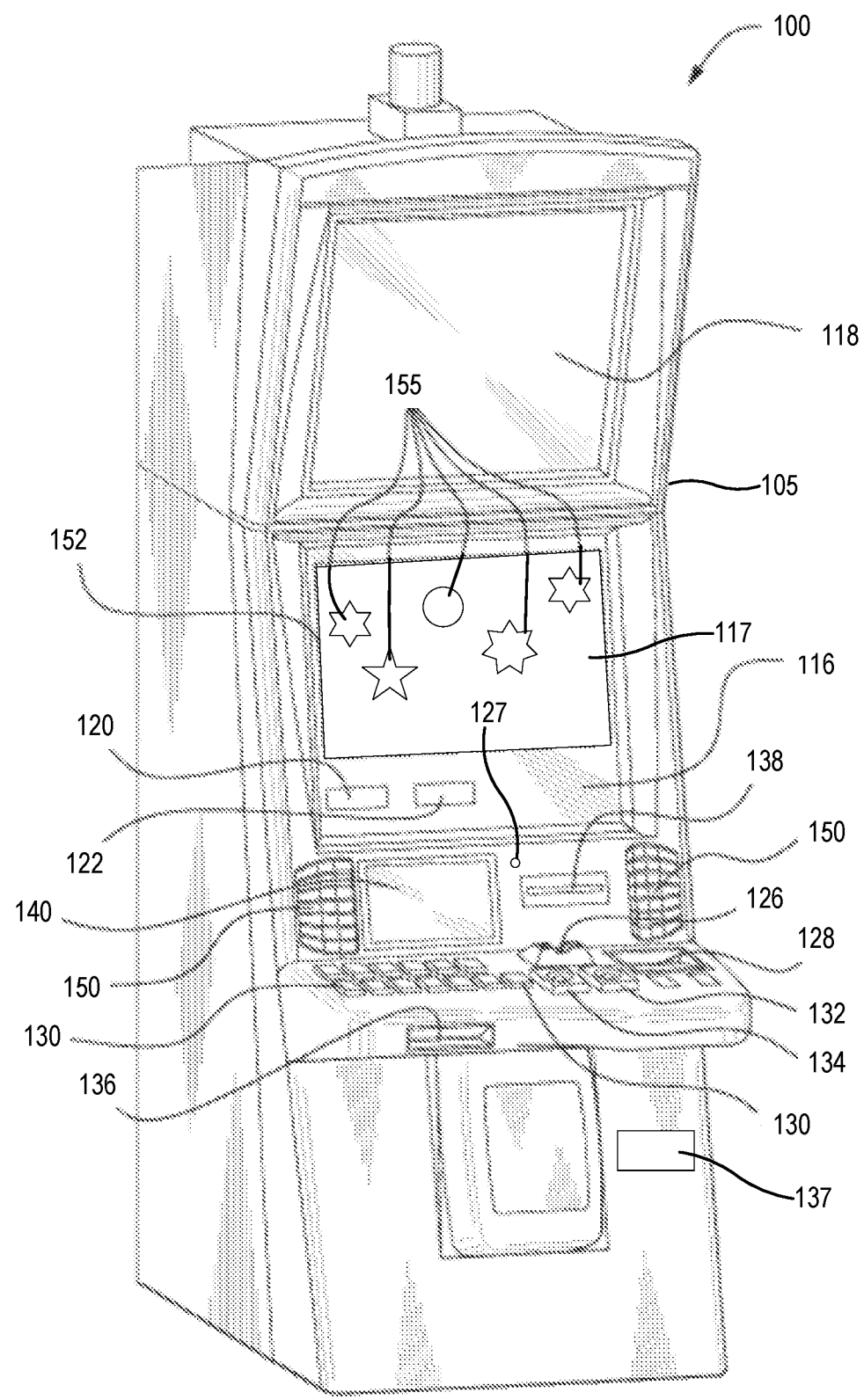
FIG. 2A is a perspective view of a gaming device that can be configured according to some embodiments.
Figure 2B:
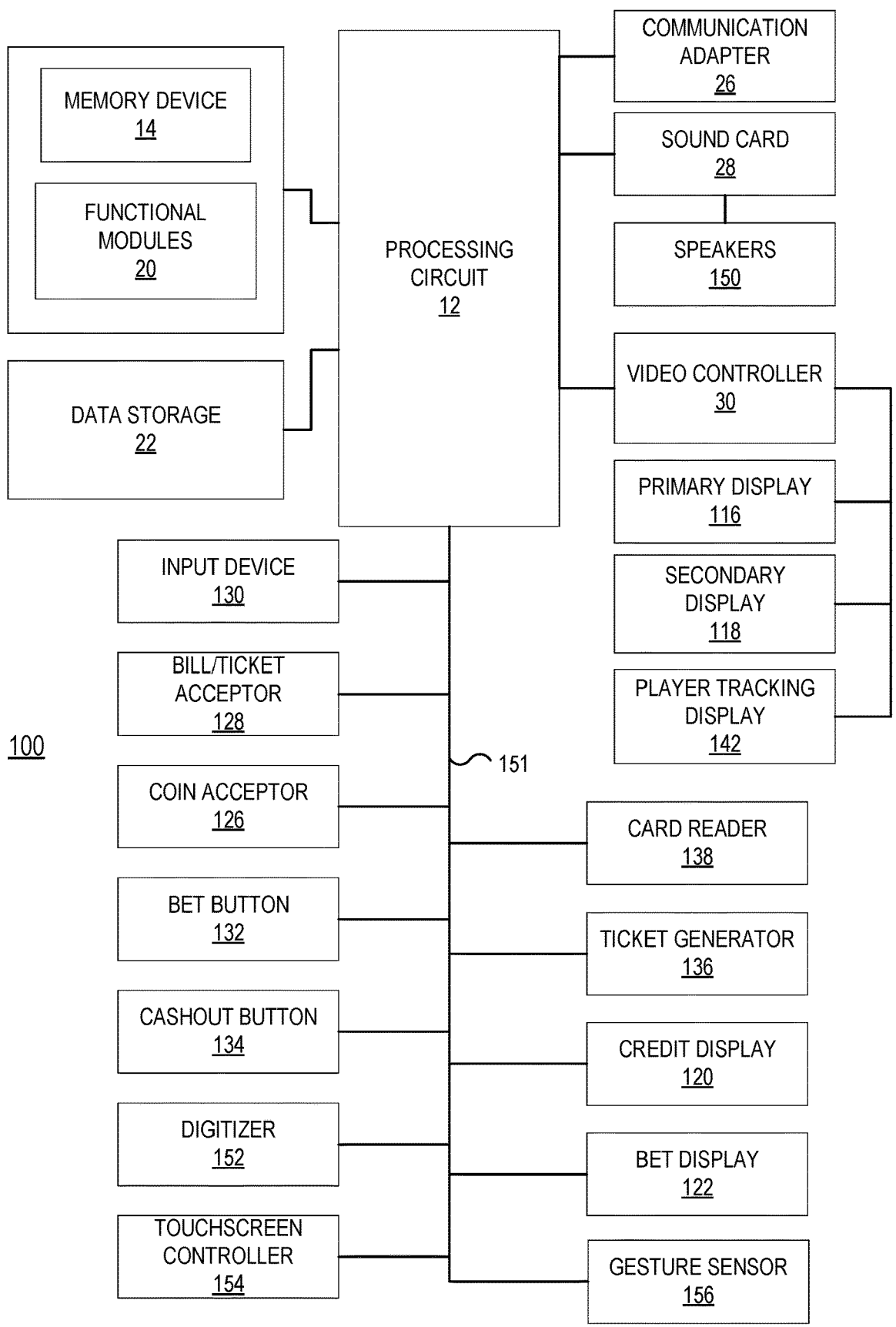
FIG. 2B is a schematic block diagram illustrating an electronic configuration for a gaming device according to some embodiments.
Figure 2C:
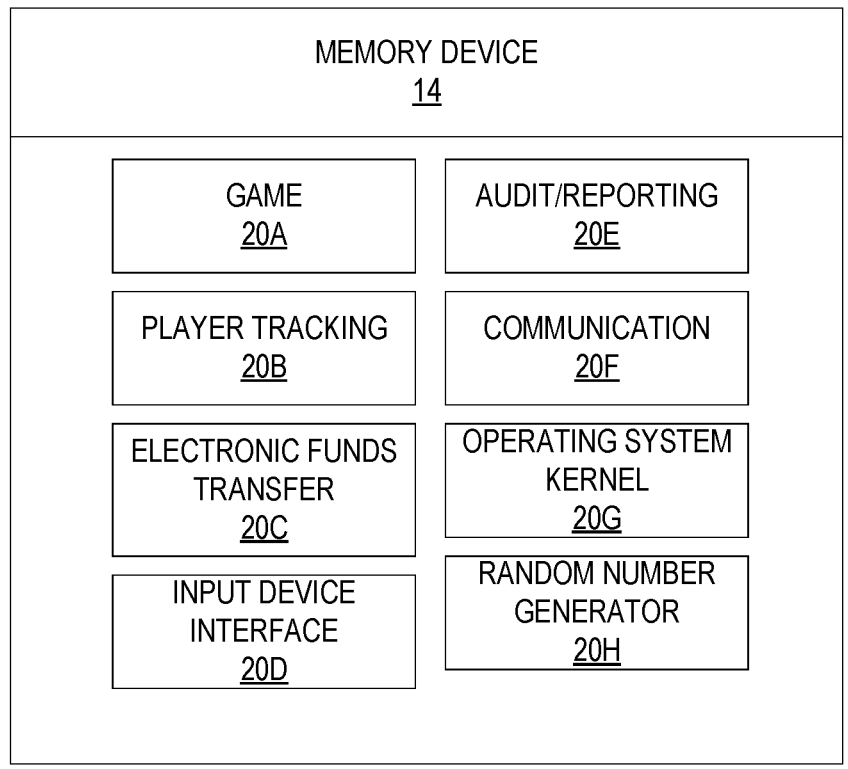
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a user to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a user's current number of credits, cash, account balance or the equivalent. The bet display 122 displays a user's amount wagered. Locations of these displays are merely illustrative as any of these displays may be located anywhere on the gaming device 100.

The player tracking display 142 may be used to display a service window that allows the user to interact with, for example, their user loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a user to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The user may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a user to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the user to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract users to the gaming device 100 and/or to engage the user during gameplay. In certain embodiments, the gaming device 100 may display a sequence of audio and/or visual attraction messages during idle periods to attract potential users to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a user may insert an identification card into a card reader of the gaming device. In some embodiments, the identification card is a smart card having a programmed microchip or a magnetic strip coded with a user's identification, credit totals (or related data) and other relevant information. In other embodiments, a user may carry a portable device, such as a cell phone, a radio frequency identification tag or any other suitable wireless device, which communicates a user's identification, credit totals (or related data) and other relevant information to the gaming device. In some embodiments, money may be transferred to a gaming device through electronic funds transfer. When a user funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, user input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, user data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a user.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a user actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the user and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a user. The electronic funds transfer module 20C communicates with a back end server or financial institution to transfer funds to and from an account associated with the user. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 comprises a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a user to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
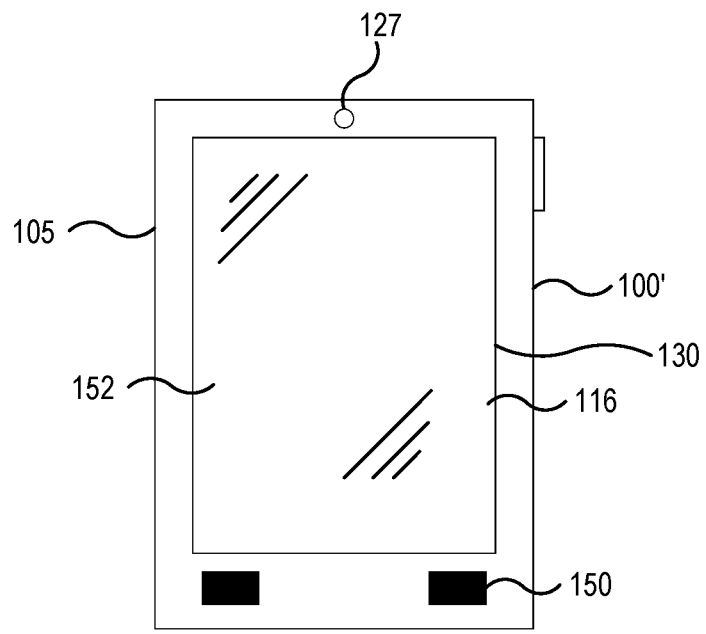
FIG. 2D is perspective view of a gaming device that can be configured according to some embodiments.

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
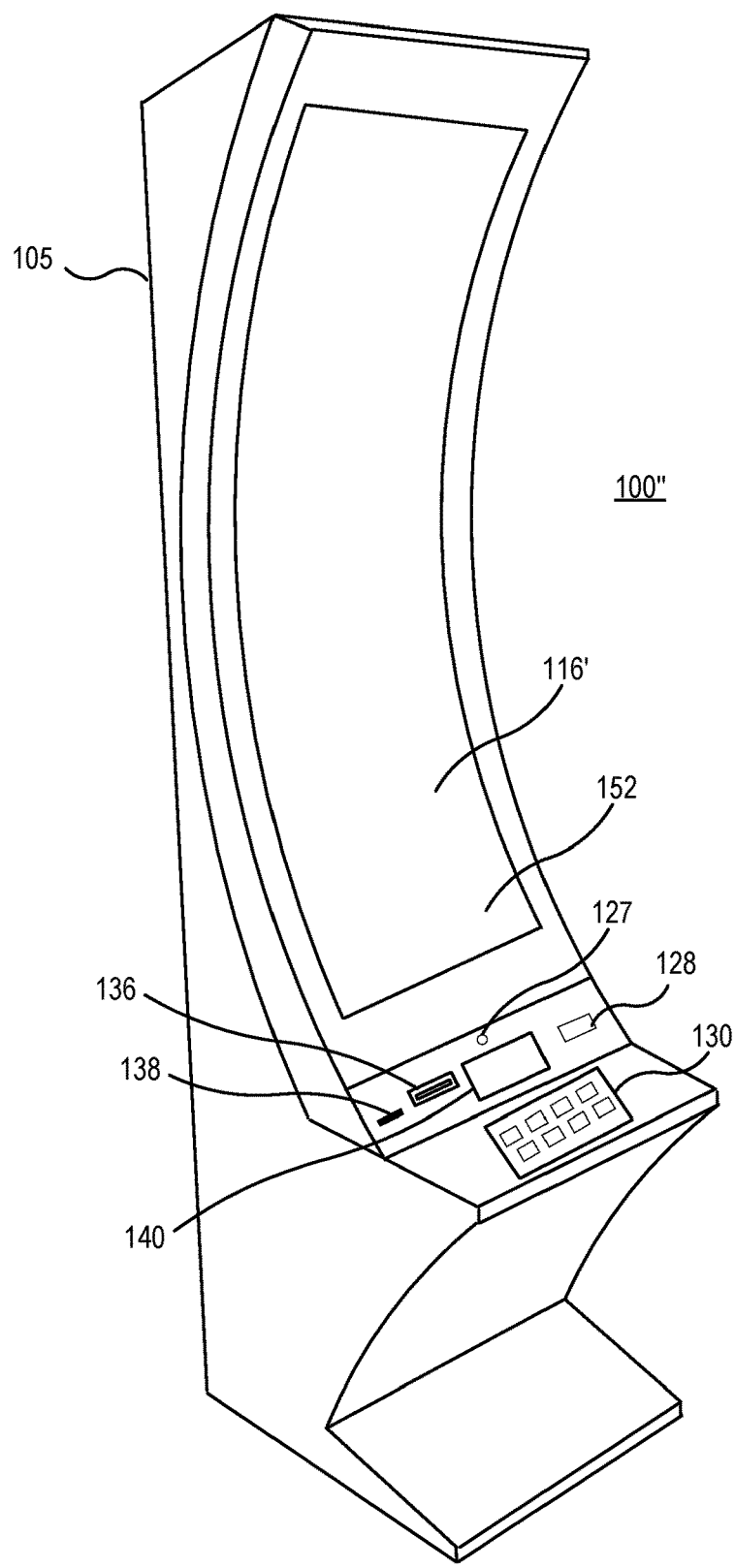
FIG. 2E is a perspective view of a gaming device according to further embodiments.

FIG. 2E illustrates a standalone gaming device 100" having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Input Device Features

Figure 3:
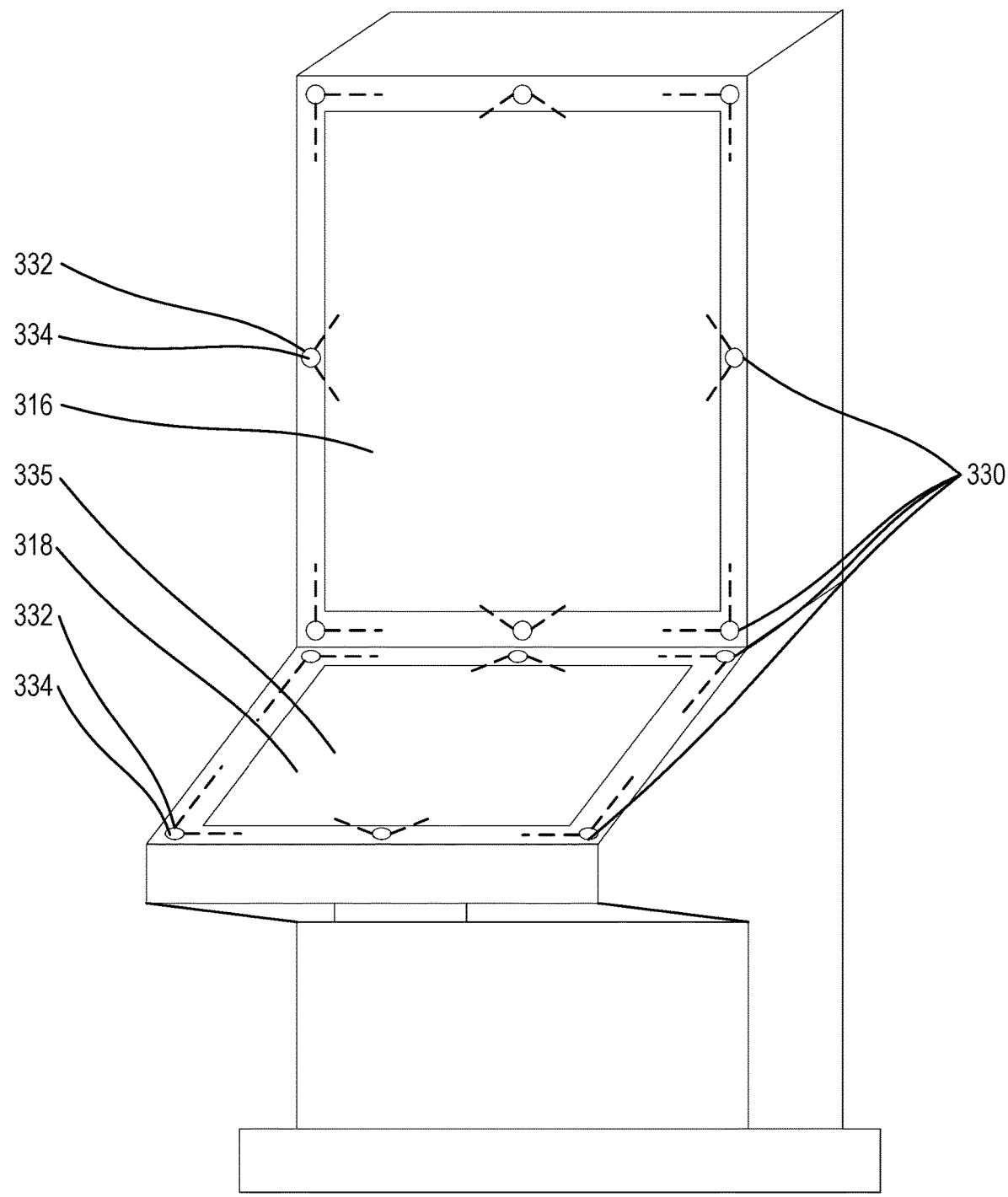
FIG. 3 is a diagram of a gaming device having gesture and touch input devices to detect user gesture and touch inputs associated with the gaming device, according to an embodiment.

Referring now to FIG. 3, a gaming device 100 having a plurality of input devices 330 is illustrated according to an embodiment. In this embodiment, the input devices 330 include gesture input devices 332 including a plurality of gesture sensors 334 to detect user gestures associated with the gaming device 100. The input devices 330 also include touch input devices 335 for detecting touch input at the display devices 316, 318.

The gesture sensors 334 are arranged around the primary display device 316 and the secondary display device 318 in order to detect gestures associated with user interface elements of the display devices 316, 318. For example, each gesture sensor 334 may provide a gesture input value corresponding to the gesture performed by the user. The gesture sensors 334 may include ultrasonic sensors, optical (e.g., infrared) sensors, image capture devices, and/or other suitable sensors for detecting gestures associated with the gaming device 100. In some embodiments, the gesture input sensors may include three-dimensional (3D) gesture input sensors to detect a 3D gesture performed by the user, with each 3D gesture input sensor providing a 3D gesture input value corresponding to the 3D gesture performed by the user.

Other Gaming Device Features

Embodiments described herein may be implemented in various configurations for gaming devices 100s, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a user. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a user.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a user prior to enabling that user to place any wagers on any plays of any wagering games. In one example, the central server, central controller, or remote host identifies the user by requiring a user account of the user to be logged into via an input of a unique username and password combination assigned to the user. It should be appreciated, however, that the central server, central controller, or remote host may identify the user in any other suitable manner, such as by validating a player tracking identification number associated with the user; by reading a player tracking card or other smart card inserted into a card reader (as described below); by validating a unique player identification number associated with the user by the central server, central controller, or remote host; or by identifying the gaming device, such as by identifying the MAC address or the IP address of the internet facilitator. In various embodiments, once the central server, central controller, or remote host identifies the user, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for users to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with users.

Figure 9:
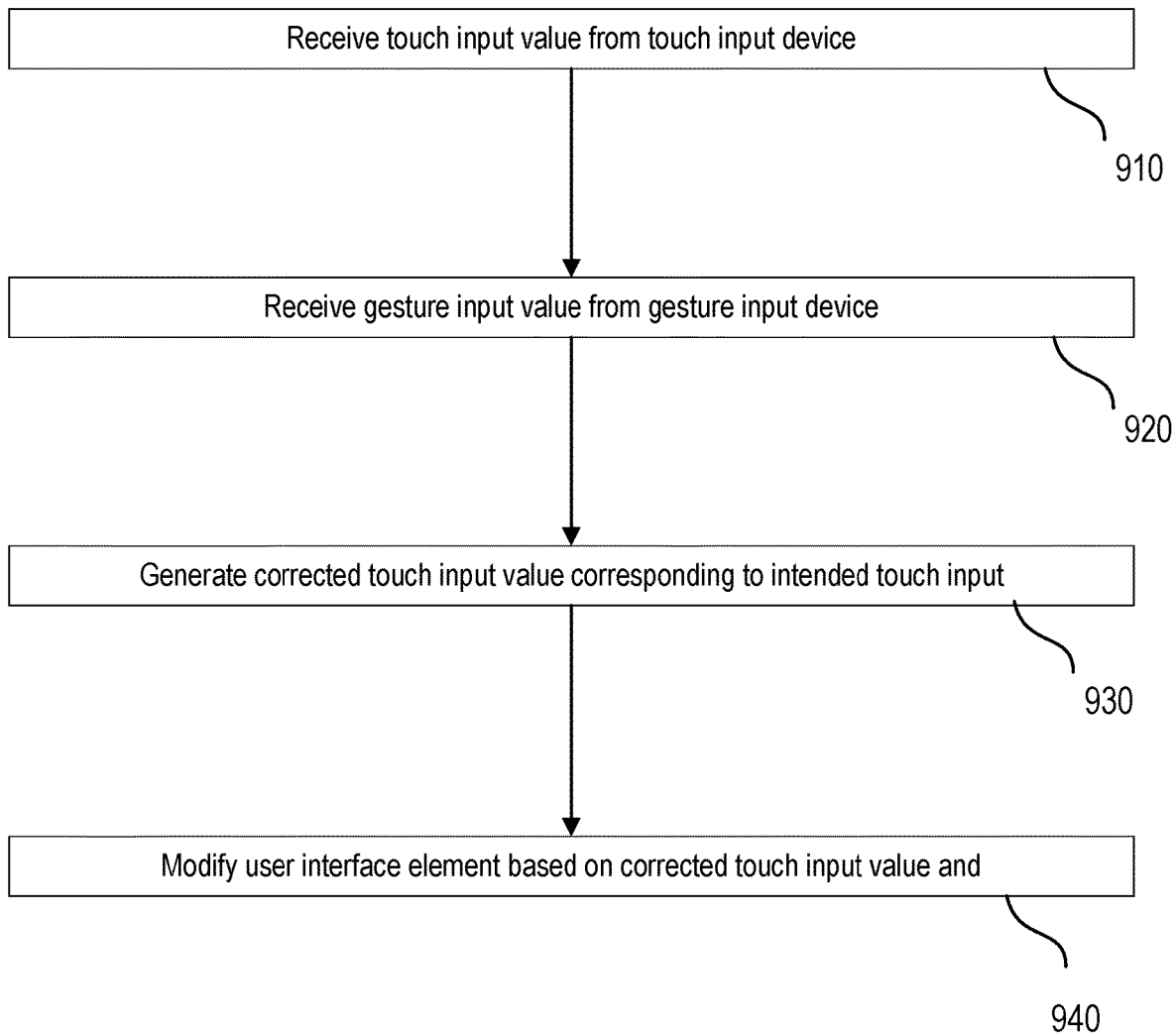
FIG. 9 is a flowchart illustrating operations of systems/methods according to some embodiments.

Reference is made to FIG. 9, which is a flowchart illustrating operations of systems/methods according to some embodiments. As provided herein, a gaming device, such as gaming device 100, may include a touch input device 335 that detects touch inputs that are received from a user and a gesture input device 332 that detects gesture inputs that are performed by the user. The gaming device 100 may include a processing circuit and a memory coupled to the processor circuit. Machine-readable instructions on the memory may, when executed by the processor circuit, cause the processor circuit to receive a touch input value from the touch input device 332 (block 910) and a gesture input value from the gesture input device 335 (block 920). In some embodiments, a corrected touch input value may be generated based on an intended touch input that is determined to be the intentional touch input from the user (block 930). Some embodiments include modifying a user interface element of the gaming device based on the first gesture input value and the corrected touch input value (block 940).

For example, the actual touch input received by the touch input device 332 may be a failed attempt to provide a touch input. In such cases, the gesture input value may be used to determine that the actual touch input that was received at the touch input device is a failed attempt to provide the intended touch input. The gesture input value may be used to determine that the actual touch input was a failed attempt and a corrected touch input value may be generated.

Some embodiments provide that the gesture input value includes one or more of a position value corresponding to a current position of a physical article of the user, a speed value corresponding to a current speed of the physical article, and a direction value corresponding to a current direction of travel of the physical article. Although the gesture input is described herein as being a physical article, embodiments herein provide that the gesture input may be provided by a physical article that may include the user's finger, hand and/or any type of physical article that may be held, controlled and/or manipulated by the user. For example, a pointer, stylus or other physical device that is under the control of the user may be used to provide the gesture input. In such embodiments, the corrected touch input value may be generated based on the position value, the speed value and/or the direction value.

Figure 4B:
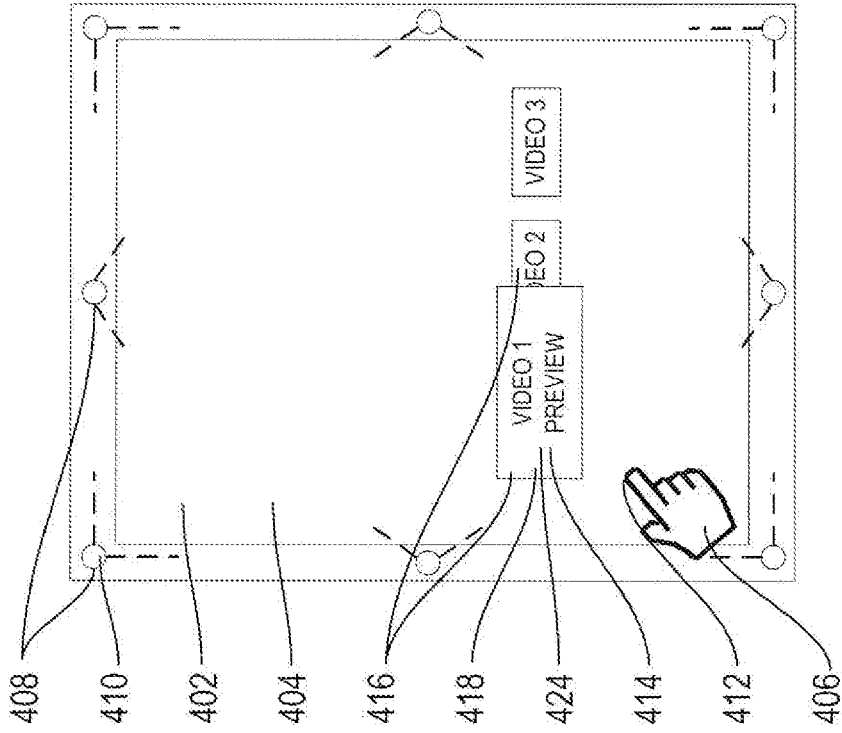
FIGS. 4A-4D are diagrams illustrating operation of the gesture and touch input devices of FIG. 3 to modify user interface elements, according to some embodiments.
Figure 4A:
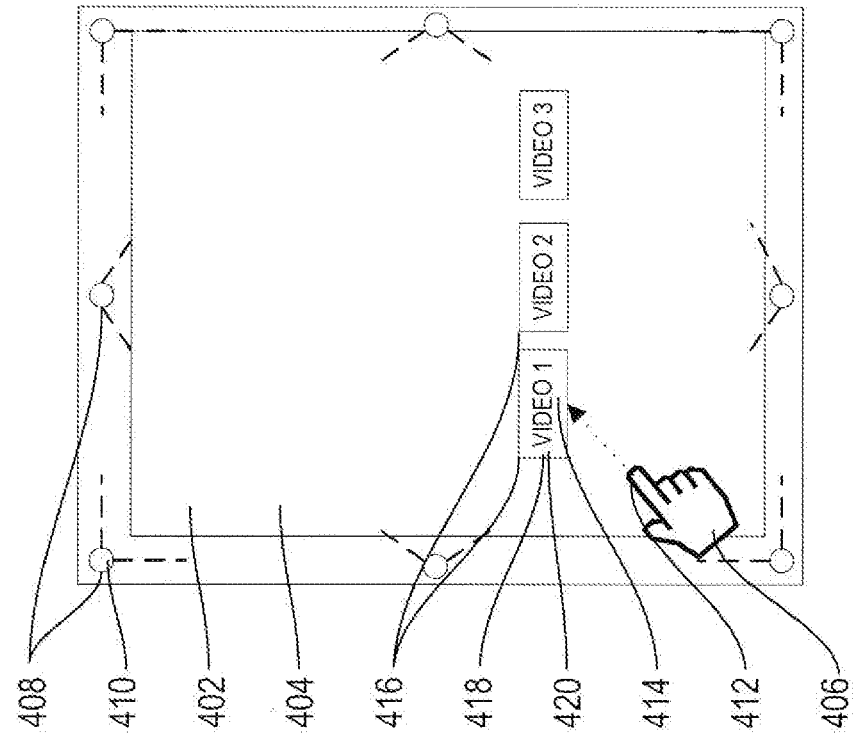

Reference is now made to FIGS. 4A-4D, which are diagrams illustrating operation of the gesture and touch input devices of FIG. 3 to modify user interface elements, according to some embodiments. As shown in FIG. 4A, the gaming device 100 includes a touch input device 402 (e.g., a touchscreen 404) to detect touch inputs performed by a user 406, and a plurality of gesture input devices 408 (e.g., image capture devices 410) to detect gesture inputs performed by the user 406. In this example, the gesture input devices 408 detect gesture inputs by the user 406 (e.g., gestures by the user's finger 412, hand, or other body part, etc.) and generate gesture input values based on the detected gesture inputs. As discussed above, each gesture input value may include a position value corresponding to a current position of the user's finger 412, a speed value corresponding to a current speed of the finger 412, a direction value corresponding to a current direction of travel of the finger 412, an acceleration value corresponding to an instant acceleration of the finger 412 in the current direction of travel of the finger 412, and/or other values corresponding to other aspects of the gesture.

A processor circuit of the gaming device 100 (or another device in communication with the gaming device 100) corrects failed touch inputs performed by the user 406 based on the gesture input values. For example, a gesture input value may indicate that the user's finger 412 is moving toward a particular location 414 on the touchscreen. The user may mistakenly touch a portion of the screen that does not correspond to the particular location 414. Based on the gesture input value, the processor circuit may correct the failed touch input to interpret that the user's finger 412 performed a touch input at that particular location 414 and may generate an intended touch input value corresponding to the corrected touch input. For example, the corrected touch input can be determined (and/or the corrected touch input value generated) based on the position value, the speed value, the direction value, the acceleration value, and/or other values.

The corrected touch input value may further be based on a previously received touch input. For example, the processor circuit may correlate a gesture input value with a previously received touch input that was performed following a similar detected gesture by the user 406 or another user. Based on the correlation, the corrected touch input value may be determined to correspond to the previously received touch input.

In the embodiment of FIGS. 4A and 4B, the processor circuit may modify a user interface element 416 (e.g., a graphical user interface element 418) of the gaming device 100, on the first gesture input value and the actual touch input value. In this embodiment, the user interface element 416 is modified to correct the actual touch input value to perform according to the intended touch input value before the user 406 performs the predicted touch input. For example, after the user performs the failed touch input, the corrected touch input value may be the basis for modifying the graphical user interface element 418 to draw the user's attention to the graphical user interface element 418. In the embodiment of FIGS. 4A-4D, the corrected touch input value may include a selection 420 of a video program 422 (see FIG. 4C). As shown in FIG. 4B, after the user 406 performs the failed touch input, a video preview 424 for the video program 422 that corresponds to the corrected touch input value may be displayed on the touchscreen 404 or another display device. It should be understood that other types of user interface elements 416 may be modified as well, such as audio user interface elements (e.g., sounds, music, etc.), haptic user interface elements (e.g., force feedback, vibration, etc.), or other types of user interface elements 416, as an alternative to or in addition to graphical user interface elements 418.

Figure 4D:
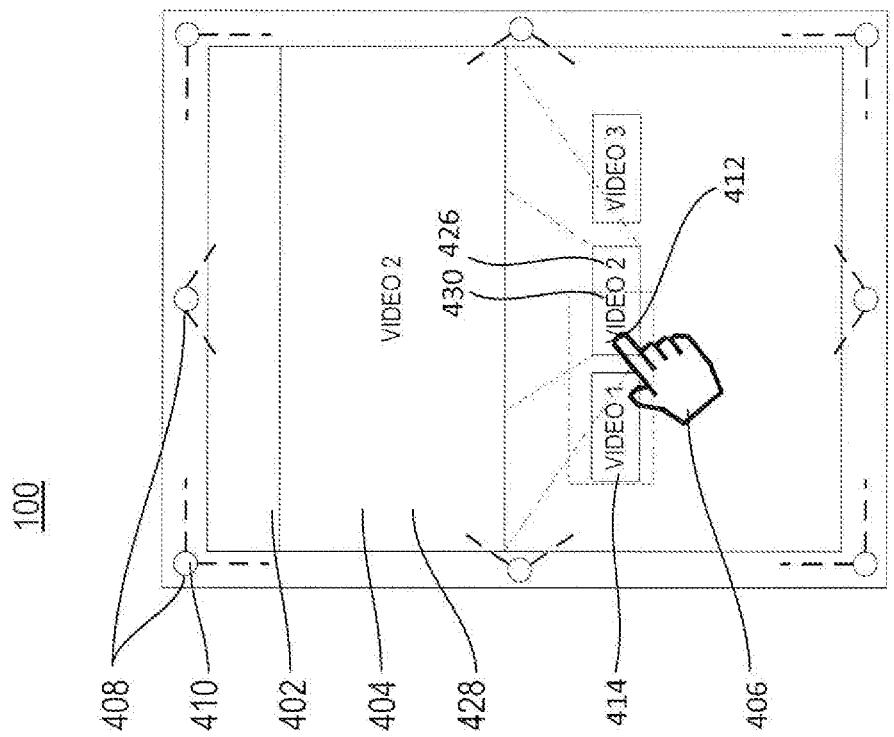
Figure 4C:
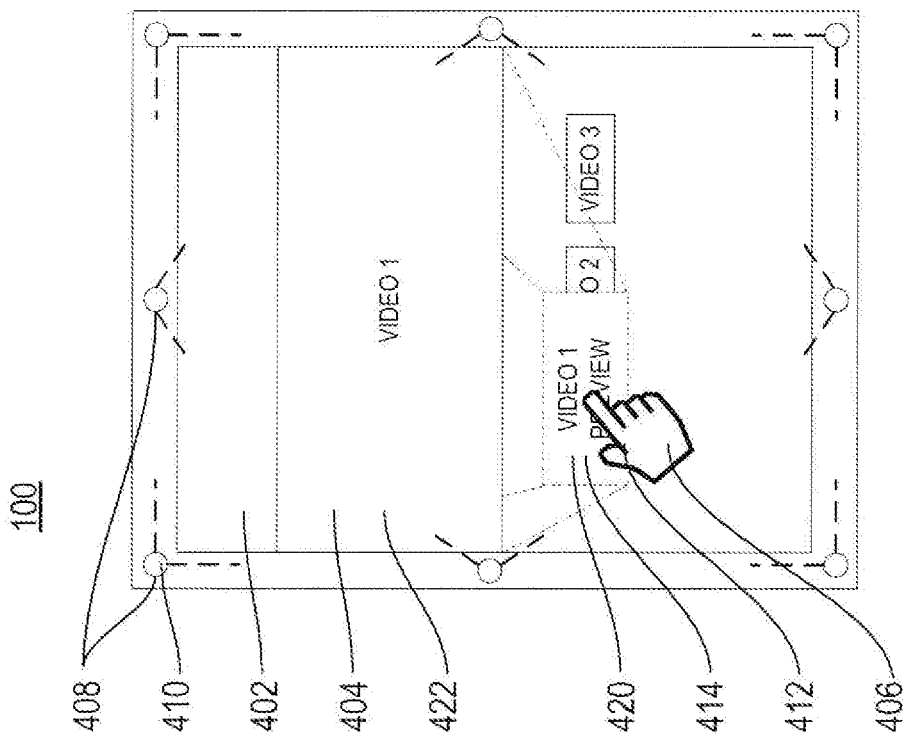

Referring now to FIG. 4C, the modified graphical user interface element 418 or other user interface elements 416 may be further modified in response to generating the corrected touch input. For example, in response to the corrected touch input corresponding to the particular location 414 and/or time, the video program 422 associated with the selection 420 at the touch input location 414 may be displayed.

Referring now to FIG. 4D, the modified graphical user interface element 418 or other user interface elements 416 may be further modified in response to the generation of the corrected touch input value. For example, in response to the user 406 performing a failed touch input corresponding to a touch input location that is different from the corrected touch input location 414 and/or time, a different video program 428 associated with a different selection 430 at the different touch input location 426 may be displayed instead of the video program that is associated with the failed touch input.

In some embodiments, the gesture input value includes an acceleration value corresponding to an instant acceleration of the finger in the current direction of travel of the finger. In such embodiments, the corrected touch input value may be generated based on the acceleration value.

In some embodiments, generating the corrected touch input value includes comparing a gesture movement time corresponding to the gesture input value with a touch interface contact time corresponding to the touch input value. Based on the comparison, the corrected touch input value may be generated based on a difference between the gesture movement time and the touch interface contact time. For example, responsive to the gesture movement time being significantly longer than the touch interface contact time, the corrected touch input value may correspond to a touch input being received at a different portion of the touch interface than the portion at which the actual touch input occurs.

In some embodiments, responsive to the touch interface contact time occurring during a time interval that is after the gesture movement time, the corrected touch input value may be generated to correspond to contact with the touch interface that would have occurred before the touch interface contact time and that corresponds to the first gesture input value. In some embodiments, the gesture movement time being longer than the touch interface contact time may cause the corrected touch input value to correspond to a swipe versus a touch. In some embodiments, the touch interface contact time includes multiple sequential touch interface contact times that correspond to sequentially occurring touch input values. In response to the gesture input value indicating that the user input included a substantially continuous movement during the multiple sequential touch interface contact times, the corrected touch input value may correspond to an uninterrupted touch input value that includes the sequentially occurring touch input values.

Figure 5A:
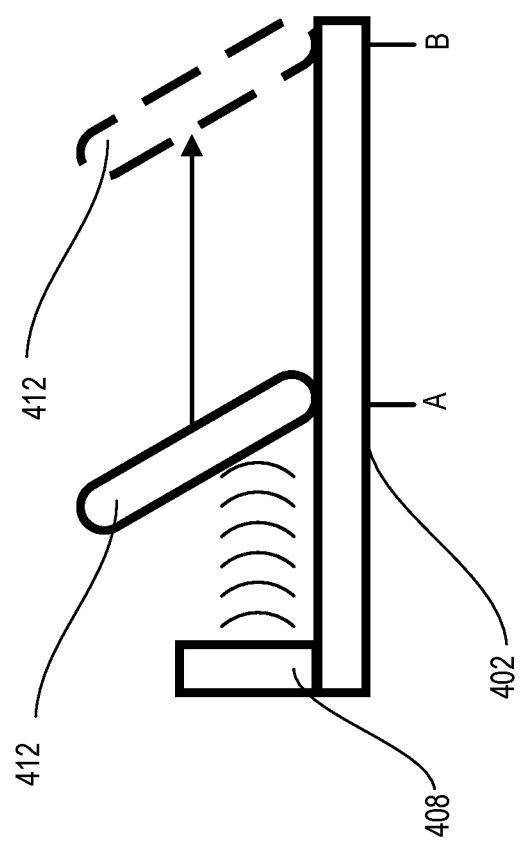
FIGS. 5A and 5B are a schematic side view of a user's finger moving along a touch screen and plots of the contact and position values generated by respective input devices according to some embodiments.
Figure 5B:
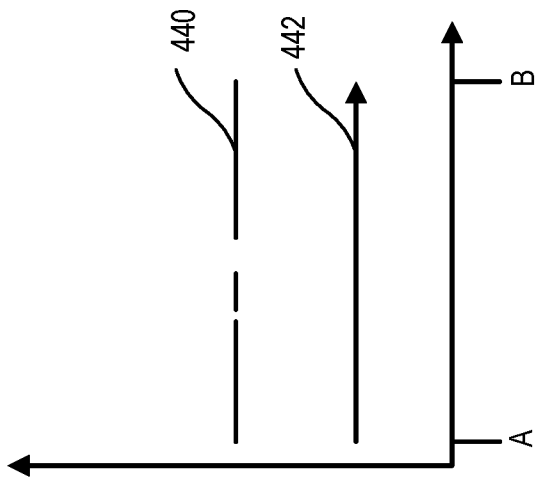

For example, brief reference is now made to FIGS. 5A and 5B, which are a schematic side view of a user's finger moving along a touch screen and plots of the contact and position values generated by respective input devices according to some embodiments. As illustrated, a user's finger 412 starts at position A of the touch input device 402 and moves to position B of the touchscreen. During this movement from position A to position B, a gesture input device 408 generates a gesture input value that corresponds to the movement of the user's finger 412. Referring to FIG. 5B, the gesture input signal value 442 that is provided by the gesture input device 408 may represent a substantially uninterrupted movement of the user's finger 412 from position A to position B of the touch input device 402. In contrast, the actual touch input value of plot 440 shows that the contact occurrences were interrupted during the movement from position A to position B. In this regard, the corrected touch input value may be generated to reflect that the user intended to provide a continuous touch input during the full range of movement from position A to position B.

In some embodiments, the gesture input value corresponds to the user touching a first portion of the touch input device and the touch input value corresponds to the user touching a second portion of the touch input device that is different from the first portion. In such embodiments, the corrected touch input value may be generated to correspond to the user touching the first portion of the touch input device and not the second portion of the touch input device.

In some embodiments, the gesture input value corresponds to the user not touching the touch input device and the touch input value corresponds to the user touching the touch input device. In such embodiments, the corrected touch input value that is generated may correspond to the user not touching the touch input device.

Figure 6:
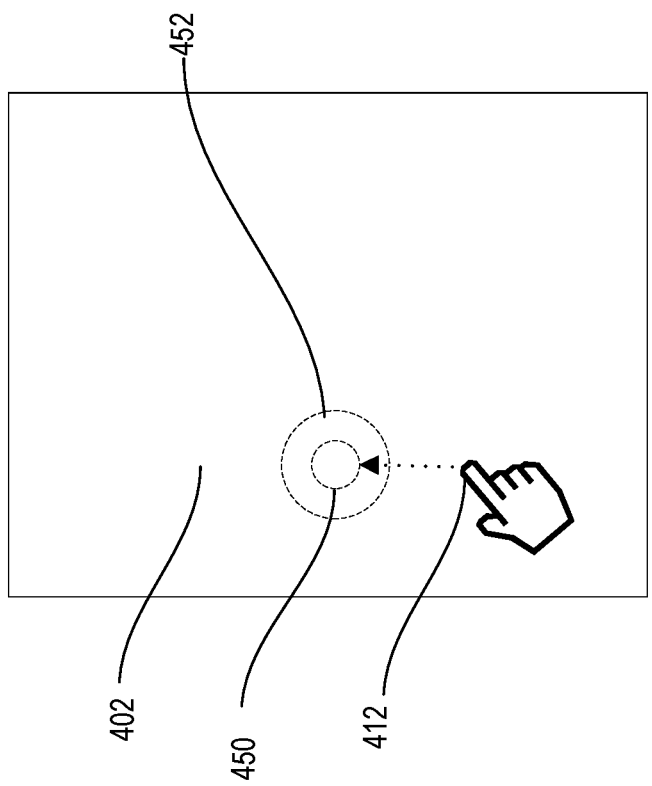
FIG. 6 is a partial schematic diagram illustrating operation of the gesture and touch input devices of FIGS. 4A-4D to modify user interface elements, according to some embodiments.

Some embodiments provide that the gesture input value corresponds to the user touching a given portion of the touch input device and the touch input value corresponds to the user touching the touch input device at a position that is different from the given portion of the touch input device. For example, brief reference is now made to FIG. 6, which is a schematic diagram illustrating operation of the gesture and touch input devices of FIGS. 4A-4D to modify user interface elements, according to some embodiments. As illustrated, the user may intend to provide the touch input to the touch input device 402 at an intended location 450. However, the touch input may actually be received at a different location 452 of the touch input device 402, which may provide a different touch input value than a touch input value corresponding to the intended location 450. In such cases, the corrected touch input value may be generated to correspond to the intended location 450 of the touch input device 402 based on the gesture input value.

In some embodiments, in response to generating the corrected touch input value, the display of the gaming device may display a user interface element that invites the user to confirm the corrected touch input value. For example, a message may be provided to the user that invites the user to confirm that the previous touch input was a failed touch input and/or that the corrected touch input is the input that the user intended. Some embodiments provide that the confirmation message may only be provided for a subset of the touch input types. For example, touch inputs related to wager execution and/or amounts may require a user to confirm that the corrected touch input value is what the user intended.

Some embodiments provide that user identification data that corresponds to the user and to multiple corrected touch input values that are generated during a wagering session by at the gaming device by the user may be stored in the memory of the gaming device and/or may be transmitted to a central data repository such as a data processing device that is external to the gaming device for storage in association with the user identification data. In this manner, the user identification data may be associated with the corrected touch input values that are generated during the wagering session. In some embodiments, the corrected touch input values that are associated with a given user and that correspond to multiple wagering sessions may be aggregated. In some embodiments, during a wagering session, the gaming device may receive historical data that is associated with the user and that corresponds to previously generated corrected touch input values. In this manner, a corrected touch input model may be generated for different users. The model may be used to identify patterns of failed touch inputs to improve the accuracy of the corrected touch input values.

Figure 7:
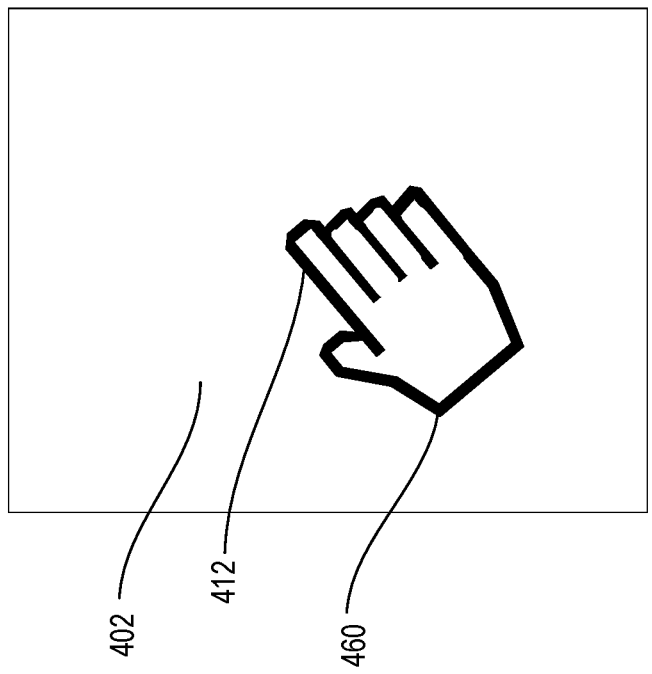
FIG. 7 is a partial schematic diagram illustrating operation of the gesture and touch input devices of FIGS. 4A-4D to modify user interface elements, according to some embodiments.

Brief reference is now made to FIG. 7, which is a schematic diagram illustrating operation of the gesture and touch input devices of FIGS. 4A-4D to modify user interface elements, according to some embodiments. In some embodiments, the touch input device 402 is a single touch input device that provides the touch input value corresponding to only a single portion of the touch input device 402. In such embodiments, the touch input device 402 may incapable of recognizing multiple touch inputs and/or may be unable to determine which one of multiple touch inputs is the intended touch input. For example, the user may contact the touch input device 402 with more than a single finger 412 (e.g, other parts of the user's hand) causing the touch input device 402 to receive multiple simultaneous touch inputs. In response to multiple locations on the touch input device 402 being touched simultaneously, the corrected touch input value may be determined based on the gesture input value and may correspond to only a single one of the different touch input device 402 locations.

Some embodiments provide that generating the corrected touch input value may include generating a confidence value corresponding to the confidence that the first touch input value is correct and that is based on the gesture input value. In some embodiments, the confidence value may be compared to a confidence value threshold and the outcome of the comparison may determine the value of the corrected touch input value. In some embodiments, the threshold value may be determined based on multiple corrected touch input values that have been generated during previously occurring wagering sessions for a given user.

In some embodiments, a user may try to provide a touch input to the touch input device 402 multiple times without the touch input device 402 recognizing the attempted inputs. In such embodiments, the gesture input value may be used to provide a corrected touch input value that corresponds to the user's attempted input efforts. Some embodiments provide that the gesture input value may be used to generate a corrected touch input value responsive to the touch input device 402 losing a portion of the touch input that the user intended to provide. Further embodiments provide that cash-sensitive buttons may be locked out of a multiple touch input.

Figure 8:
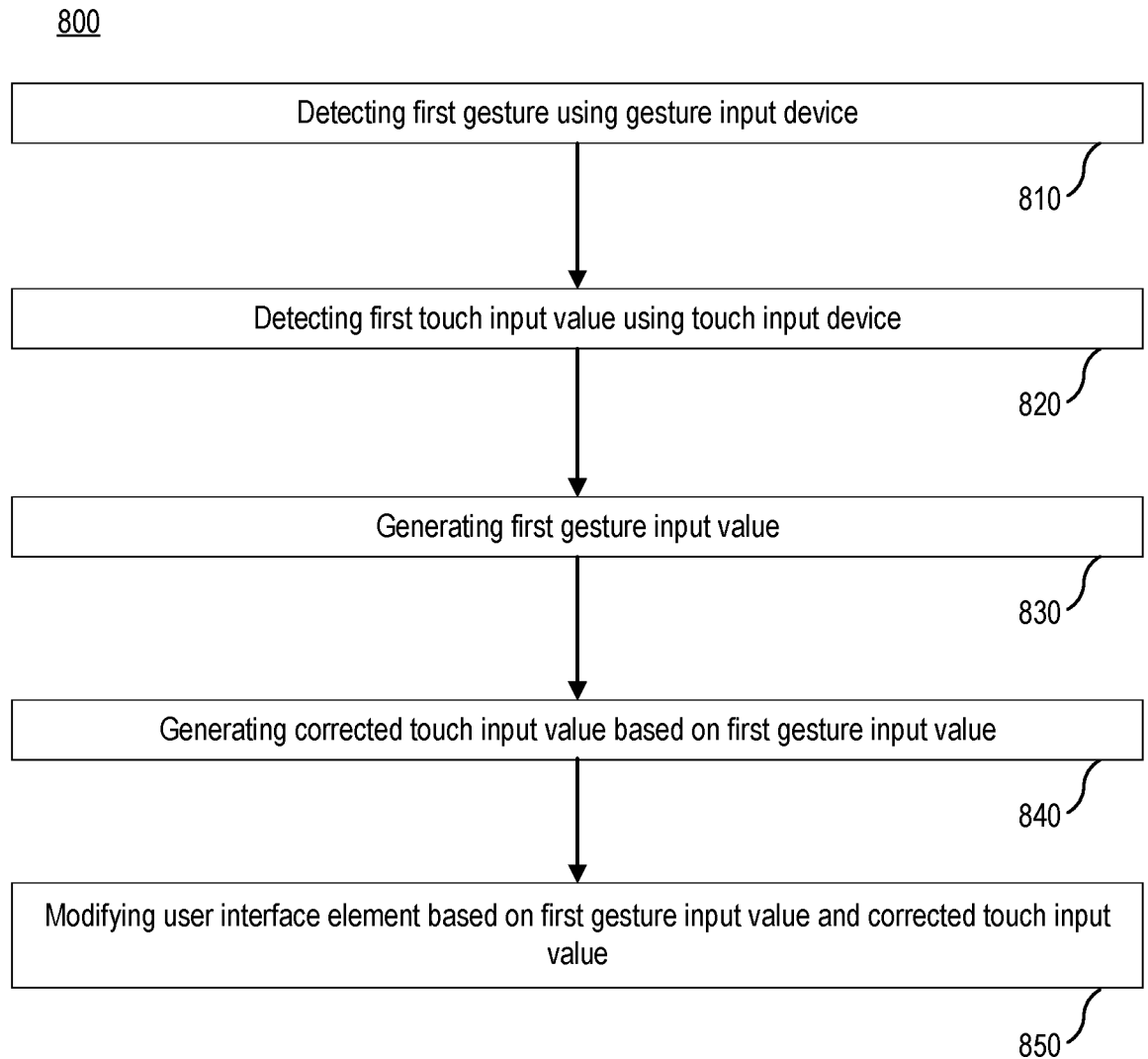
FIG. 8 is a flowchart illustrating operations of systems/methods according to some embodiments.

Reference is now made to FIG. 8, which is a flowchart illustrating operations 800 of systems/methods according to some embodiments. Some embodiments include detecting, by a gesture input device of a gaming device, a first gesture by a user of the gaming device (block 810). In some embodiments, detecting the first gesture includes detecting a current position of a finger of the user, detecting a current speed of the finger, and/or detecting a current direction of travel of the finger. In some embodiments, the detecting the first gesture may include detecting only one of the current position, the current speed and/or the current direction of travel of the finger.

Operations may include detecting, by a touch input device of the gaming device, a first touch input value from the user (block 820) and generating, by the gesture input device, a first gesture input value based on the first gesture (block 830). In some embodiments, generating the first gesture input value includes at least one of generating a position value based on the current position of the finger of the user, generating a speed value based on the current speed of the finger and generating a direction value based on the current direction of travel of the finger.

Operations may include generating, based on the first gesture input value, a corrected touch input value corresponding to an intended touch input that is determined to be intended by the user and that is different from the first touch input value (block 840). In some embodiments, the corrected touch input value is based on one or more of the position value, the speed value, and/or the direction value.

Operations may include modifying a user interface element of the gaming device based on the first gesture input value and the corrected touch input value (block 850). In some embodiments, modifying the user interface of the gaming device includes changing a visual characteristic of the user interface corresponding to the corrected touch input value.

Figure 10:
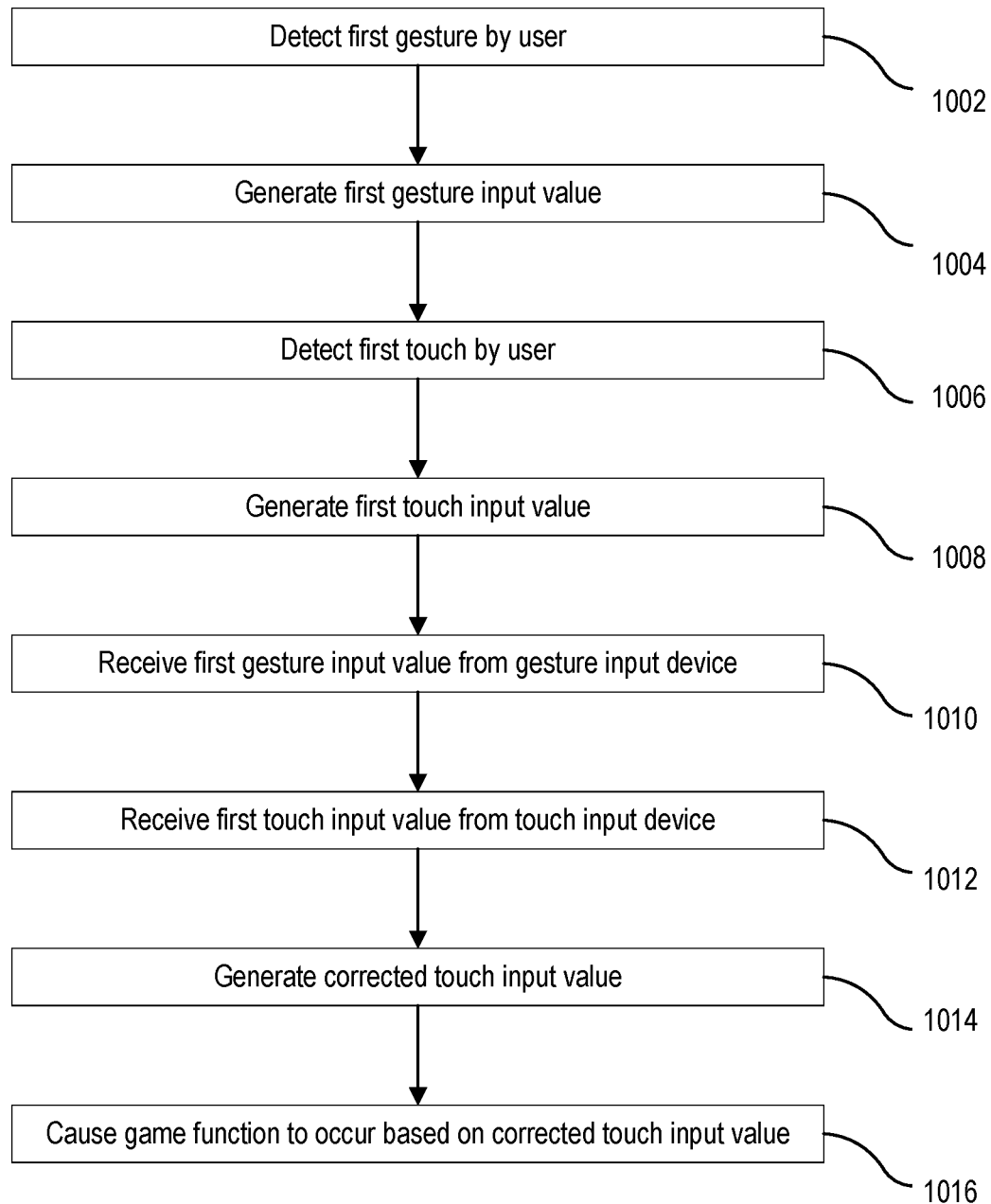
FIG. 10 is a flowchart illustrating operations of systems/methods according to some embodiments.

Reference is now made to FIG. 10, which is a flowchart illustrating operations 1000 of systems/methods according to some embodiments. According to some embodiments, operations of systems/methods may include causing a gesture input device of a gaming device to detect a first gesture by a user of the gaming device (block 1002) and to generate a first gesture input value based on the first gesture (block 1004). Operations may include causing a touch input device of the gaming device to detect a first touch by the user on the touch input device (block 1006) and to generate a first touch input value based on the first touch (block 1008).

Operations may cause a processor circuit of the gaming device to receive the first gesture input value from the gesture input device (block 1010) and to receive a first touch input value from the touch input device that corresponds to the first touch input (block 1012). The processor circuit may be further caused to generate, based on the first gesture input value and the first touch input value, a corrected touch input value (block 1014) and cause a game function to occur based on the corrected touch input value and not the first touch input value (block 1016).

In some embodiments, the touch input device includes a single touch input device that provides the first touch input value corresponding to a single portion of the touch input device. Some embodiments provide that, in response to multiple different portions of the touch input device being touched simultaneously, the corrected touch input value is determined based on the first gesture input value and corresponds to a single one of the different portions of the touch input device.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising
   a touch input device to detect touch inputs received from a user;

a gesture input device to detect gesture inputs performed by the user;
a processor circuit; and
a memory coupled to the processor circuit, the memory comprising machine-readable instructions that, when executed by the processor circuit, cause the processor circuit to:
receive a first touch input value from the touch input device;
receive a first gesture input value from the gesture input device;
generate, based on the first gesture input value, a corrected touch input value corresponding to an intended touch input that is determined to be intended by the user; and
modify a user interface element of the gaming device based on the first gesture input value and the corrected touch input value.

2. The gaming device of claim 1, wherein the first gesture input value comprises:
a speed value corresponding to a current speed of a physical article being controlled by the user; and
a direction value corresponding to a current direction of travel of the physical article,
wherein the instructions that cause the processor circuit to generate the corrected touch input value further cause the processor circuit to generate the corrected touch input value based on the speed value and the direction value.

3. The gaming device of claim 1, wherein the first gesture input value comprises:
a plurality of position values; and
an acceleration value corresponding to an instant acceleration of a physical article being controlled by the user in a current direction of travel of the physical article,
wherein the instructions that cause the processor circuit to generate the corrected touch input value further cause the processor circuit to:
generate the corrected touch input value further based on the acceleration value.

4. The gaming device of claim 1, wherein the instructions that cause the processor circuit to generate, based on the first gesture input value, the corrected touch input value corresponding to an intended touch input that is determined to be intended by the user further cause the processor circuit to:
compare a gesture movement time corresponding to the first gesture input value and a touch interface contact time corresponding to the first touch input value; and
generate the corrected touch input value based on a comparison of the gesture movement time and the touch interface contact time.

5. The gaming device of claim 4, wherein, responsive to the touch interface contact time occurring during a time interval that is after the gesture movement time, generating the corrected touch input value to correspond to contact with the touch input device that would have occurred before the touch interface contact time and that corresponds to the first gesture input value.

6. The gaming device of claim 4, wherein the touch interface contact time comprises a plurality of touch interface contact times that correspond to a plurality of sequentially occurring touch input values that comprise the first touch input value, and
wherein the corrected touch input value corresponds to an uninterrupted touch input value that comprises the plurality of sequentially occurring touch input values.

7. The gaming device of claim 1, wherein the first gesture input value corresponds to the user touching a first portion of the touch input device and the first touch input value corresponds to the user touching a second portion of the touch input device that is different from the first portion, and
wherein the instructions that cause the processor circuit to generate, based on the first gesture input value, the corrected touch input value further cause the processor circuit to:
generate the corrected touch input value to correspond to the user touching the first portion of the touch input device.

8. The gaming device of claim 1, wherein the first gesture input value corresponds to the user not touching the touch input device and the first touch input value corresponds to the user touching the touch input device, and
wherein the instructions that cause the processor circuit to generate, based on the first gesture input value, the corrected touch input value further cause the processor circuit to generate the corrected touch input value to correspond to the user not touching the touch input device.

9. The gaming device of claim 1, wherein the first gesture input value corresponds to the user touching a given portion of the touch input device and the first touch input value corresponds to the user touching the touch input device at a position that is not the given portion of the touch input device, and
wherein the instructions that cause the processor circuit to generate, based on the first gesture input value, the corrected touch input value further cause the processor circuit to generate the corrected touch input value to correspond to the given portion of the touch input device.

10. The gaming device of claim 1, wherein responsive to generating the corrected touch input value, the processor circuit is further caused to cause a display of the gaming device to display a user interface element that invites the user to confirm the corrected touch input value.

11. The gaming device of claim 1, wherein the processor circuit is further caused to store, in the memory, user identification data that corresponds to the user and a plurality of corrected touch input values that are generated during a wagering session by at the gaming device by the user, and
wherein the user identification data is associated with the plurality of corrected touch input values that are generated during the wagering session.

12. The gaming device of claim 11, wherein the processor circuit is further caused to send the user identification data and the plurality of corrected touch input values that are associated with the user to a data processing device that is external to the gaming device and that aggregates the plurality of corrected touch input values that are associated with the user and that correspond to a plurality of wagering sessions.

13. The gaming device of claim 12, wherein, during a currently occurring wagering session, the processor circuit is further caused to receive historical data that is associated with the user and that corresponds to previously generated corrected touch input values.

14. The gaming device of claim 1, wherein the touch input device comprises a single touch input device that provides the first touch input value corresponding to a single portion of the touch input device, and
wherein, responsive to a plurality of distinct portions of the touch input device being touched simultaneously, the corrected touch input value is determined based on the first gesture input value and corresponds to a single one of the plurality of distinct portions of the touch input device.

15. The gaming device of claim 1, wherein the processor circuit is further caused to:
   generate a confidence value that corresponds to a confidence that the first touch input value is correct and that is based on the first gesture input value; and
   compare the confidence value to a confidence value threshold, wherein an outcome of the comparing determines the corrected touch input value.

16. The gaming device of claim 15, wherein the confidence value threshold is determined based on a plurality of corrected touch input values generated during previously occurring wagering sessions.

17. A method comprising:
   detecting, by a gesture input device of a gaming device, a first gesture by a user of the gaming device;
   detecting, by a touch input device of the gaming device, a first touch input value from the user;
   generating, by the gesture input device, a first gesture input value based on the first gesture;
   generating, based on the first gesture input value, a corrected touch input value corresponding to an intended touch input that is determined to be intended by the user and that is different from the first touch input value; and
   modifying a user interface element of the gaming device based on the first gesture input value and the corrected touch input value.

18. The method of claim 17 wherein detecting the first gesture comprises:
   detecting a current position of a finger of the user;
   detecting a current speed of the finger; and
   detecting a current direction of travel of the finger,
   wherein generating the first gesture input value further comprises:
      generating a position value based on the current position of the finger of the user;
      generating a speed value based on the current speed of the finger; and
      generating a direction value based on the current direction of travel of the finger, wherein generating the corrected touch input value is further based on the position value, the speed value, and the direction value, and wherein modifying the user interface element of the gaming device comprises changing a visual characteristic of the user interface element corresponding to the corrected touch input value.

19. A system comprising
   a processor circuit; and
   a memory coupled to the processor circuit, the memory comprising machine-readable instructions that, when executed by the processor circuit:
   cause a gesture input device of a gaming device to:
      detect a first gesture by a user of the gaming device; and
      generate a first gesture input value based on the first gesture;
   cause a touch input device of the gaming device to:
      detect a first touch by the user on the touch input device; and
      generate a first touch input value based on the first touch; and
   cause the processor circuit to:
      receive the first gesture input value from the gesture input device;
      receive a first touch input value from the touch input device that corresponds to the first touch;
      generate, based on the first gesture input value and the first touch input value, a corrected touch input value; and
      cause a game function to occur based on the corrected touch input value and not the first touch input value.

20. The system of claim 19, wherein the touch input device comprises a single touch input device that provides the first touch input value corresponding to a single portion of the touch input device, and
   wherein, responsive to a plurality of distinct portions of the touch input device being touched simultaneously, the corrected touch input value is determined based on the first gesture input value and corresponds to a single one of the plurality of distinct portions of the touch input device.

* * * * *